(12) United States Patent
Zhang et al.

(10) Patent No.: US 12,469,544 B2
(45) Date of Patent: Nov. 11, 2025

(54) SENSE AMPLIFIER CIRCUITRY AND THRESHOLD VOLTAGE COMPENSATION

(71) Applicant: Micron Technology, Inc., Boise, ID (US)

(72) Inventors: Wenlun Zhang, Chofu (JP); Hiroki Fujisawa, Sagamihara (JP); Shinichi Miyatake, Sagamihara (JP); Yuan He, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 166 days.

(21) Appl. No.: 18/506,202

(22) Filed: Nov. 10, 2023

(65) Prior Publication Data

US 2024/0290376 A1 Aug. 29, 2024

Related U.S. Application Data

(60) Provisional application No. 63/487,448, filed on Feb. 28, 2023.

(51) Int. Cl.
*G11C 11/00* (2006.01)
*G11C 5/14* (2006.01)
*G11C 11/4091* (2006.01)
*G11C 11/4096* (2006.01)

(52) U.S. Cl.
CPC .......... *G11C 11/4091* (2013.01); *G11C 5/147* (2013.01); *G11C 11/4096* (2013.01)

(58) Field of Classification Search
CPC ....... G11C 11/4091; G11C 7/065; G11C 7/12; G11C 7/08; G11C 11/4074; G11C 11/4076; G11C 11/4096; G11C 2029/0411; G11C 8/10; G11C 2207/104; G11C 2207/229; G11C 5/147; G11C 7/04; G11C 7/18; G11C 7/22; G11C 8/08; G11C 11/2273; G11C 11/4094; G11C 2207/002; G11C 7/02; G11C 7/06; G11C 7/1006
USPC .............. 365/190, 207, 189.16, 208, 230.03, 365/233.16
See application file for complete search history.

(56) References Cited

U.S. PATENT DOCUMENTS 11,120,847 B2 * 9/2021 Kawamura .............. G11C 8/10

* cited by examiner

*Primary Examiner* — Thong Q Le
(74) *Attorney, Agent, or Firm* — Fletcher Yoder, P.C.

(57) ABSTRACT

Sense amplifiers for memory devices may include threshold voltage compensation circuitry configured to compensate a threshold voltage offset of a portion of the sense amplifier. Additionally, the sense amplifiers also perform pre-sensing of the portion of the sense amplifier. Moreover, the sense amplifier is configured to perform main sensing and latching in a phase after pre-sensing the portion of the sense amplifier.

20 Claims, 6 Drawing Sheets

SENSE AMPLIFIER CIRCUITRY AND THRESHOLD VOLTAGE COMPENSATION

CROSS-REFERENCE TO RELATED APPLICATIONS

This application claims priority to U.S. Application No. 63/487,448, filed Feb. 28, 2023, entitled "Sense Amplifier Circuitry and Threshold Voltage Compensation," which is incorporated by reference herein in its entirety for all purposes.

BACKGROUND

Field of the Present Disclosure

Embodiments of the present disclosure relate generally to memory devices. More specifically, embodiments of the present disclosure relate to sense amplifiers of a memory device.

Description of Related Art

Generally, a computing system may include electronic devices that, in operation, communicate information via electrical signals. For example, a computing system may include a processor communicatively coupled to a memory device, such as a dynamic random-access memory (DRAM) device, a ferroelectric random-access memory (FeRAM) device, another random-access memory (RAM) device, and/or a hybrid device that incorporates more than one type of RAM. In this manner, the processor may communicate with the memory device, for example, to retrieve executable instructions, retrieve data to be processed, by the processor, and/or store data output from the processor.

These memory devices utilize sense amplifiers used by the memory devices during read operations. Specifically, the sense circuitry of the memory device utilizes the sense amplifiers to receive low voltage signals and amplify the small voltages to enable the memory device to interpret the data properly. However, due to the large number of sense amplifiers in the memory device any excess consumption of resources (e.g., power) in a sense amplifier may impact the efficiency of the memory device's resources even when the change in a single sense amplifier is relatively small. Furthermore, some sense amplifiers may be sensitive to threshold voltage mismatches between sense amplifier latch devices (e.g., NMOS and/or PMOS transistors) and may be used to compensate for these threshold voltage mismatches using threshold voltage compensation (VTC). However, VTC may use DC through-current that consumes a relatively large amount (e.g., 14%) of all power consumption of memory devices. The DC through-current may negatively impact VTC. Furthermore, pattern noise may significantly deteriorate a sense margin and hinder intrinsic VTC performance using traditional VTC techniques. Furthermore, corner-dependent noise may further complicate device enhancement/optimization.

Embodiments of the present disclosure may be directed to one or more of the problems set forth above.

DETAILED DESCRIPTION

One or more specific embodiments will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As previously discussed, the sense circuitry of the memory device utilizes the sense amplifiers to receive low voltage (e.g., low differential) signals and amplify the small voltage differences to enable the memory device to interpret the data properly. However, some embodiments of the sense amplifiers consume excess resources (e.g., power). Thus, as taught herein, the sense amplifiers may be modified to perform VTC for NMOS transistors (NSA VT) without performing VTC of PMOS transistors of the sense amplifiers. The NSA VT may be followed by NSA pre-sensing. This NSA VT followed by NSA pre-sensing may reduce or eliminate the DC through current's impact during VTC. Also, by separating the N-type portion (NSA) and P-type (PSA) portion sensing, the impact of pattern noise may be reduced or eliminated thereby increasing sense margin results.

Figure 1:
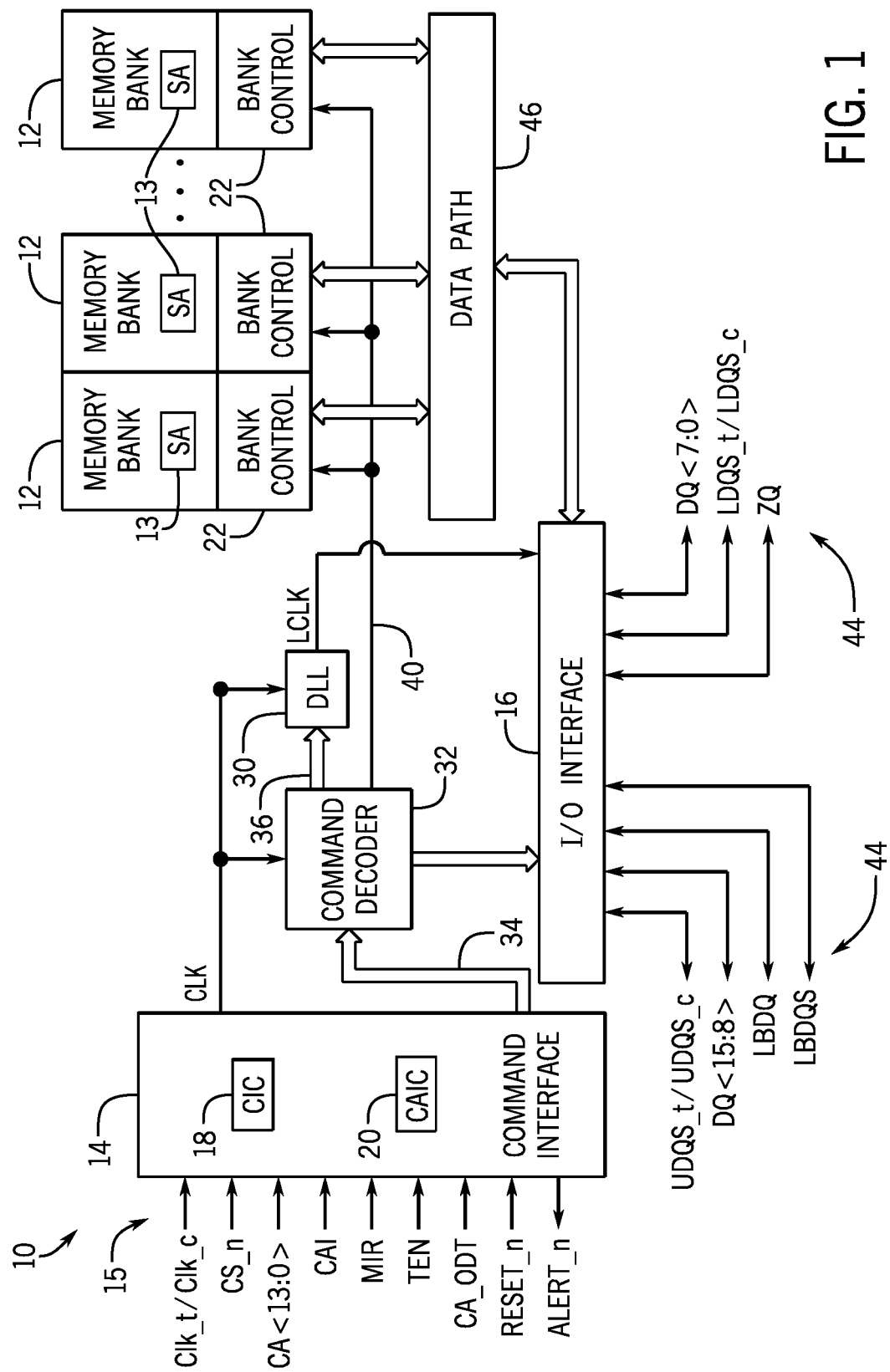
FIG. 1 is a simplified block diagram illustrating certain features of a memory device having sense amplifiers, according to an embodiment of the present disclosure.

Turning now to the figures, FIG. 1 is a simplified block diagram illustrating certain features of a memory device 10. Specifically, the block diagram of FIG. 1 is a functional block diagram illustrating certain functionality of the memory device 10. In accordance with one embodiment, the memory device 10 may be a double data rate type five synchronous dynamic random-access memory (DDR5 SDRAM) device. Various features of DDR5 SDRAM allow for reduced power consumption, more bandwidth and more storage capacity compared to prior generations of DDR SDRAM.

The memory device 10 may include a number of memory banks 12. The memory banks 12 may be DDR5 SDRAM memory banks, for instance. The memory banks 12 may be provided on one or more chips (e.g., SDRAM chips) that are arranged on dual inline memory modules (DIMMS). Each DIMM may include a number of SDRAM memory chips (e.g., x8 or x16 memory chips), as will be appreciated. Each SDRAM memory chip may include one or more memory banks 12. The memory device 10 represents a portion of a single memory chip (e.g., SDRAM chip) having a number of memory banks 12. For DDR5, the memory banks 12 may be further arranged to form bank groups. For instance, for an 8 gigabyte (Gb) DDR5 SDRAM, the memory chip may include 16 memory banks 12, arranged into 8 bank groups, each bank group including 2 memory banks. For a 16 Gb DDR5 SDRAM, the memory chip may include 32 memory banks 12, arranged into 8 bank groups, each bank group including 4 memory banks, for instance. Various other configurations, organization, and sizes of the memory banks 12 on the memory device 10 may be utilized depending on the application and design of the overall system.

The memory banks 12 and/or bank control blocks 22 include sense amplifiers 13. As previously noted, sense amplifiers 13 are used by the memory device 10 during sense operations. Specifically, sense circuitry of the memory device 10 utilizes the sense amplifiers 13 to receive low voltage (e.g., low differential) signals from the memory cells of the memory banks 12 and amplifies the small voltage differences to enable the memory device 10 to interpret the data properly.

The memory device 10 may include a command interface 14 and an input/output (I/O) interface 16. The command interface 14 is configured to provide a number of signals (e.g., signals 15) from an external (e.g., host) device (not shown), such as a processor or controller. The processor or controller may provide various signals 15 to the memory device 10 to facilitate the transmission and receipt of data to be written to or read from the memory device 10.

As will be appreciated, the command interface 14 may include a number of circuits, such as a clock input circuit 18 and a command address input circuit 20, for instance, to ensure proper handling of the signals 15. The command interface 14 may receive one or more clock signals from an external device. Generally, double data rate (DDR) memory utilizes a differential pair of system clock signals, the true clock signal Clk_t and the bar/complementary clock signal Clk_c. The positive clock edge for DDR refers to the point where the rising true clock signal Clk_t crosses the falling complementary clock signal Clk_c, while the negative clock edge indicates transition of the falling true clock signal Clk_t and the rising of the complementary clock signal Clk_c. Commands (e.g., read command, write command, activate command, precharge command, etc.) are typically entered on the positive edges of the clock signal and data is transmitted or received on both the positive and negative clock edges.

The clock input circuit 18 receives the true clock signal Clk_t and the complementary clock signal Clk_c and generates an internal clock signal CLK. The internal clock signal CLK is supplied to an internal clock generator, such as a delay locked loop (DLL) circuit 30. The DLL circuit 30 generates a phase controlled internal clock signal LCLK based on the received internal clock signal CLK. The phase controlled internal clock signal LCLK is supplied to the I/O interface 16, for instance, and is used as a timing signal for determining an output timing of read data. In some embodiments, the clock input circuit 18 may include circuitry that splits the clock signal into multiple (e.g., 4) phases. The clock input circuit 18 may also include phase detection circuitry to detect which phase receives a first pulse when sets of pulses occur too frequently to enable the clock input circuit 18 to reset between sets of pulses.

The internal clock signal(s)/phases CLK may also be provided to various other components within the memory device 10 and may be used to generate various additional internal clock signals. For instance, the internal clock signal CLK may be provided to a command decoder 32. The command decoder 32 may receive command signals from the command bus 34 and may decode the command signals to provide various internal commands. For instance, the command decoder 32 may provide command signals to the DLL circuit 30 over the bus 36 to coordinate generation of the phase controlled internal clock signal LCLK. The phase controlled internal clock signal LCLK may be used to clock data through the IO interface 16, for instance.

Further, the command decoder 32 may decode commands, such as read commands, write commands, mode-register set commands, activate commands, precharge commands, etc., and provide access to a particular memory bank 12 corresponding to the command, via the bus path 40. As will be appreciated, the memory device 10 may include various other decoders, such as row decoders and column decoders, to facilitate access to the memory banks 12. In one embodiment, each memory bank 12 includes the bank control block 22 which provides the necessary decoding (e.g., row decoder and column decoder), as well as other features, such as timing control and data control, to facilitate the execution of commands to and from the memory banks 12.

The memory device 10 executes operations, such as read commands and write commands, based on the command/address signals received from an external device, such as a processor. In one embodiment, the command/address bus may be a 14-bit bus to accommodate the command/address signals (CA<13:0>). The command/address signals are clocked to the command interface 14 using the clock signals (Clk_t and Clk_c). The command interface may include a command address input circuit 20, which is configured to receive and transmit the commands to provide access to the memory banks 12, through the command decoder 32, for instance. In addition, the command interface 14 may receive a chip select signal (CS_n). The CS_n signal enables the memory device 10 to process commands on the incoming CA<13:0> bus. Access to specific banks 12 within the memory device 10 is encoded on the CA<13:0> bus with the commands.

In addition, the command interface 14 may be configured to receive a number of other command signals. For instance, a command/address on die termination (CA_ODT) signal may be provided to facilitate proper impedance matching within the memory device 10. A reset command (RESET_n) may be used to reset the command interface 14, status registers, state machines and the like, during power-up for instance. The command interface 14 may also receive a command/address invert (CAI) signal which may be provided to invert the state of command/address signals CA<13:0> on the command/address bus, for instance, depending on the command/address routing for the particular memory device 10. A mirror (MIR) signal may also be provided to facilitate a mirror function. The MIR signal may be used to multiplex signals so that they can be swapped for enabling certain routing of signals to the memory device 10, based on the configuration of multiple memory devices in a particular application. Various signals to facilitate testing of the memory device 10, such as the test enable (TEN) signal, may be provided, as well. For instance, the TEN signal may be used to place the memory device 10 into a test mode for connectivity testing.

The command interface 14 may also be used to provide an alert signal (ALERT_n) to the system processor or controller for certain errors that may be detected. For instance, an alert signal (ALERT_n) may be transmitted from the memory device 10 if a cyclic redundancy check (CRC) error is detected. Other alert signals may also be generated. Further, the bus and pin for transmitting the alert signal (ALERT_n) from the memory device 10 may be used as an input pin during certain operations, such as the connectivity test mode executed using the TEN signal, as described above.

Data may be sent to and from the memory device 10, utilizing the command and clocking signals discussed above, by transmitting and receiving data signals 44 through the IO interface 16. More specifically, the data may be sent to or retrieved from the memory banks 12 over the datapath 46, which includes a plurality of bi-directional data buses. Data IO signals, generally referred to as DQ signals, are generally transmitted and received in one or more bi-directional data busses. For certain memory devices, such as a DDR5 SDRAM memory device, the IO signals may be divided into upper and lower bytes. For instance, for a x16 memory device, the IO signals may be divided into upper and lower IO signals (e.g., DQ<15:8> and DQ<7:0>) corresponding to upper and lower bytes of the data signals, for instance.

To allow for higher data rates within the memory device 10, certain memory devices, such as DDR memory devices may utilize data strobe signals, generally referred to as DQS signals. The DQS signals are driven by the external processor or controller sending the data (e.g., for a write command) or by the memory device 10 (e.g., for a read command). For read commands, the DQS signals are effectively additional data output (DQ) signals with a predetermined pattern. For write commands, the DQS signals are used as clock signals to capture the corresponding input data. As with the clock signals (Clk_t and Clk_c), the DQS signals may be provided as a differential pair of data strobe signals (DQS_t and DQS_c) to provide differential pair signaling during reads and writes. For certain memory devices, such as a DDR5 SDRAM memory device, the differential pairs of DQS signals may be divided into upper and lower data strobe signals (e.g., UDQS_t and UDQS_c; LDQS_t and LDQS_c) corresponding to upper and lower bytes of data sent to and from the memory device 10, for instance.

An impedance (ZQ) calibration signal may also be provided to the memory device 10 through the IO interface 16. The ZQ calibration signal may be provided to a reference pin and used to tune output drivers and ODT values by adjusting pull-up and pull-down resistors of the memory device 10 across changes in process, voltage, and temperature (PVT) values. Because PVT characteristics may impact the ZQ resistor values, the ZQ calibration signal may be provided to the ZQ reference pin to be used to adjust the resistance to calibrate the input impedance to known values. As will be appreciated, a precision resistor is generally coupled between the ZQ pin on the memory device 10 and GND/VSS external to the memory device 10. This resistor acts as a reference for adjusting internal ODT and drive strength of the IO pins.

In addition, a loopback data signal (LBDQ) and loopback strobe signal (LBDQS) may be provided to the memory device 10 through the IO interface 16. The loopback data signal and the loopback strobe signal may be used during a test or debugging phase to set the memory device 10 into a mode wherein signals are looped back through the memory device 10 through the same pin. For instance, the loopback signal may be used to set the memory device 10 to test the data output (DQ) of the memory device 10. Loopback may include both LBDQ and LBDQS or possibly just a loopback data pin. This is generally intended to be used to monitor the data captured by the memory device 10 at the IO interface 16. LBDQ may be indicative of a target memory device, such as memory device 10, data operation and, thus, may be analyzed to monitor (e.g., debug and/or perform diagnostics on) data operation of the target memory device. Additionally, LBDQS may be indicative of a target memory device, such as memory device 10, strobe operation (e.g., clocking of data operation) and, thus, may be analyzed to monitor (e.g., debug and/or perform diagnostics on) strobe operation of the target memory device.

As will be appreciated, various other components such as power supply circuits (for receiving external VDD and VSS signals), mode registers (to define various modes of programmable operations and configurations), read/write amplifiers (to amplify signals during read/write operations), temperature sensors (for sensing temperatures of the memory device 10), etc., may also be incorporated into the memory device 10. Accordingly, it should be understood that the block diagram of FIG. 1 is only provided to highlight certain functional features of the memory device 10 to aid in the subsequent detailed description. Furthermore, although the foregoing discusses the memory device 10 as being a DDR5 device, the memory device 10 may be any suitable device (e.g., a low-power double data rate (LPDDR) device, a double data rate type 4 DRAM (DDR4) device, a ferroelectric RAM device, or a combination of different types of memory devices).

Figure 2:
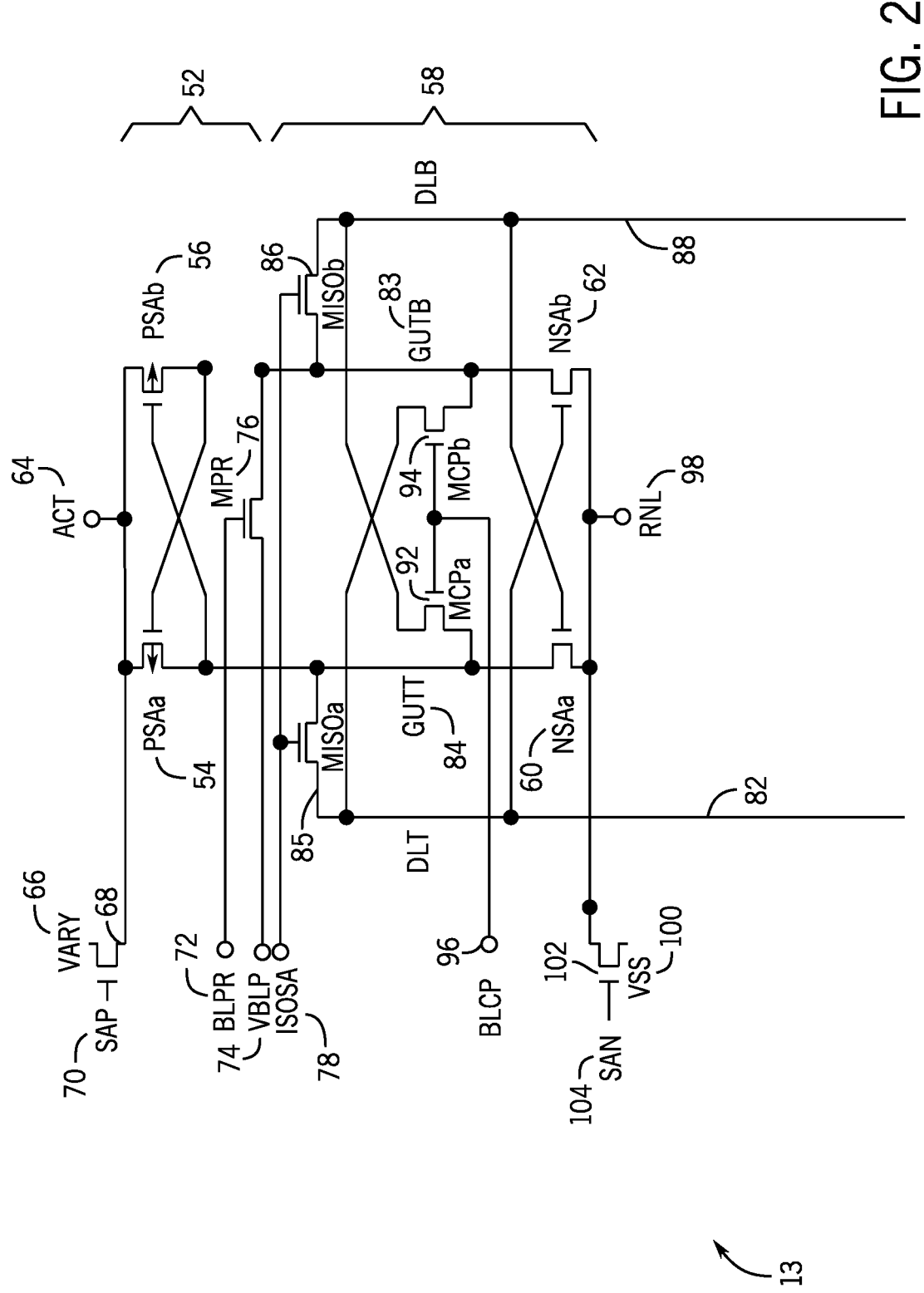
FIG. 2 is a circuit diagram of an embodiment of the sense amplifiers of FIG. 1, according to an embodiment of the present disclosure.

FIG. 2 is a circuit diagram of a sense amplifier 13 that may be implemented as an embodiment shown in FIG. 1. Although only a single sense amplifier 13 is shown, multiple sense amplifiers 13 are included in the memory device 10 that function similarly and may share at least some control signals and/or supply voltages.

As illustrated, the sense amplifier 13 includes a PSA portion 52 that includes PMOS transistors PSAa 54 and PSAb 56. The sense amplifier 13 also includes an NSA portion 58 that includes NMOS transistors NSAa 60 and NSAb 62. The PSAa 54 and PSAb 56 receive an ACT signal 64 at terminals (e.g., source terminals) of the PSAa 54 and PSAb 56 via a "top node." Although the illustrated embodiment shows both of the PSAa 54 and PSAb 56 coupled to the same ACT signal 64 and thus receiving the same voltage, some embodiments of the sense amplifier 13 may connect the PSAa 54 and PSAb 56 to different ACT signals to enable the source terminals of the PSAa 54 and PSAb 56 to be driven at different voltage levels. The ACT signal 64 is generally used to control data movement and control of the sense amplifier 13. The ACT signal 64 may be driven using an array voltage (VARY) 66 that is selectively coupled and decoupled from the PSAa 54 and PSAb 56 as the ACT signal 64 by a transistor 68 controlled using an SAP signal 70.

A BLPR signal 72 may be used to provide a voltage using a VBLP signal 74. The BLPR signal 72 may cause selectively coupling of the VBLP signal 74 to a terminal (e.g., drain) of the PSAb 56 via a transistor 76 (e.g., NMOS transistor).

Another terminal (e.g., drain) of the PSAa 54 is coupled to the DLT 82 that is selectively coupled to a gut node true (GUTT) 84, and another terminal (e.g., drain) of the PSAb 56 is coupled to the DLB 88 that is selectively couple to a gut node bar (GUTB) 83. The gate terminal of the PSAa 54 is also coupled to the GUTB 83, and the gate terminal of the PSAb 56 is also coupled to the GUTT 84. In other words, the PSAa 54 and the PSAb 56 are cross-coupled PMOS transistors coupled between the gut nodes and the ACT signal 64. As previously discussed, the sense amplifier 13 receives signals from a memory cell and amplifies any difference. The sense amplifier 13 is selectively coupled to the memory cell via digit lines DLT 82 and DLB 88. DLT 82 carries the value (e.g., 1) from the memory cell indicating the value of a stored bit while DLB 88 is complementary to the value (e.g., 0). An isolation ISOSA signal 78 may be used to selectively couple and decouple the GUTT 84 to and from DLT 82 via transistor MISOa 85 and to selectively couple and decouple the GUTB 83 to and from the DLB 88 via transistor MISOb 86. Transistors MCPa 92 and MCPb 94 may be used to couple DLB 88 to GUTT 84 and to couple DLT 82 to GUTB 83, respectively, using a BLCP signal 96.

The NSAa 60 has a terminal (e.g., source terminal) coupled to the GUTT 84 while the gate terminal of the NSAa 60 is coupled to the DLB 88. Similarly, the NSAb 62 has a terminal (e.g., source terminal) coupled to the GUTB 83 while the gate terminal of the NSAb 62 is coupled to the DLT 82. The other terminals of the NMOS transistors 60 and 62 are coupled together to an RNL signal 98. The RNL signal 98 (e.g., NMOS strobe signal) may be a selectable voltage that may strobe the NSAa 60 and NSAb 62 to a voltage level (e.g., ground/VSS 100) to complete latching once amplification in the sense amplifier 13 has amplified the relatively low voltage from the memory cell. For instance, this RNL signal 98 may transition to VSS 100 for such latching via a transistor 102 when a SAN signal 104 is asserted.

In operation, the sense amplifier 13 of FIG. 2 may operate using VTC that compensates threshold voltage offsets of a combination of the PSAa 54, the PSAb 56, the NSAa 60, and the NSAb 62 in combination. However, this may result in a poor compensation ratio and large operation current during VTC. The sense amplifier 13 uses a charge sharing operation after VTC and then performs a one-step main sensing with firing both the SAN signal 104 and the SAP signal 70. However, this one-step main sensing methodology may result in corner-dependent noise having a relatively large impact on sense margins.

Figure 3:
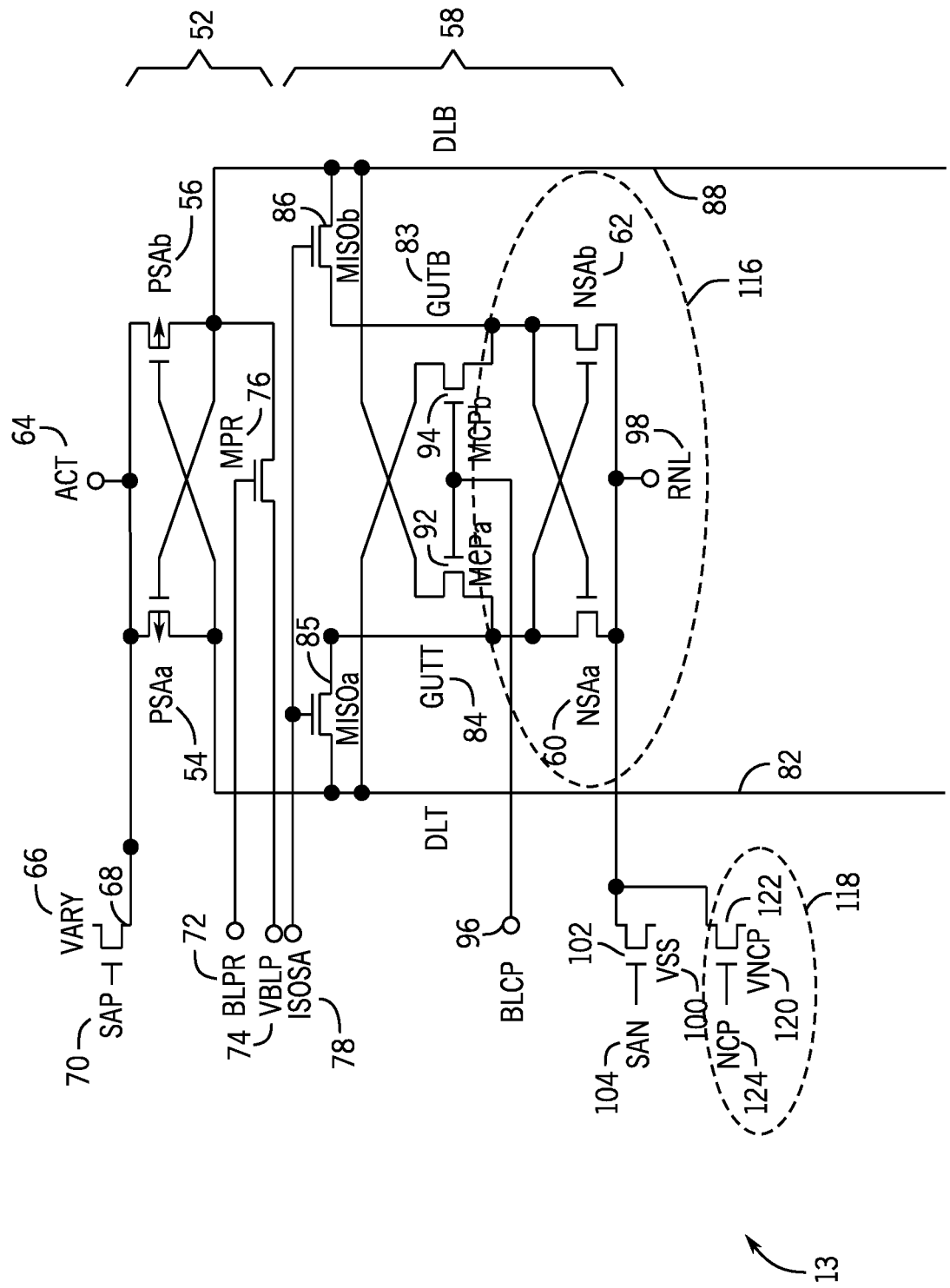
FIG. 3 is a circuit diagram of an alternative embodiment of the sense amplifiers of FIG. 1 that uses NMOS pre-sensing, according to an embodiment of the present disclosure.

To address these issues, an alternative configuration of the sense amplifier 13 may be used that bifurcates sensing between main sensing and NSA pre-sensing before the main sensing while also compensating a threshold voltage offset for the NSA transistors alone without the PSA transistor threshold voltage offsets. FIG. 3 is a circuit diagram of an embodiment of the sense amplifier 13 with NSA-specific VTC and bifurcated main and NSA sensing. The embodiment of the sense amplifier 13 in FIG. 3 is similar to the embodiment of the sense amplifier 13 in FIG. 2 except in regions 116 and 118.

In the region 116, the connections to the terminals (e.g., sources) of the NSAa 60 to DLB 88 and of the NSAb 62 to DLT 82 are moved to GUTB 83 and GUTT 84, respectively. As discussed below, this causes the NSAa 60 and the NSAb 62 to be connected to different digit lines during compensation and main sense phases. For example, the NSAb 62 discharges DLT 82 during compensation phase while being connected to DLB 88 during a main sensing phase.

In the region 118, the RNL signal 98 is capable of being driven to different voltage levels using different driving voltages VSS 100 and VNCP 120 using different respective transistors 102 and 122 using different control signals: the SAN signal 104 and an NCP signal 124. The VNCP 120 may be a high-resolution regulatable voltage to carefully control the NSA operation at a near sub-threshold region when compensating for threshold voltage mismatches.

Figure 4:
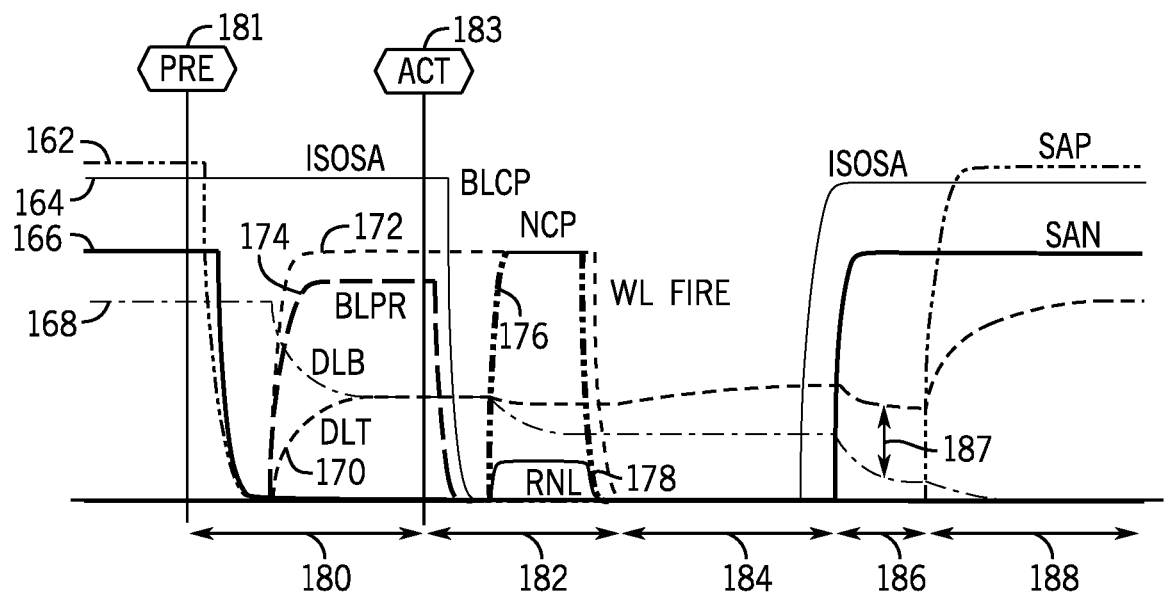
FIG. 4 is a graph of a timing diagram for using the sense amplifier of FIG. 3, according to an embodiment of the present disclosure.

FIG. 4 is a graph 160 showing operation of the embodiment of the sense amplifier 13 of FIG. 3. The graph 160 includes a line 162, a line 164, a line 166, a line 168, a line 170, a line 172, a line 174, a line 176, and a line 178. The line 162 corresponds to the SAP signal 70. The line 164 corresponds to the ISOSA signal 78. The line 166 corresponds to the SAN signal 104. The line 168 corresponds to the DLB 88, and the line 170 corresponds to the DLT 82. The line 172 corresponds to the BLCP signal 96. The line 174 corresponds to the BLPR signal 72. The line 176 corresponds to the NCP signal 124. The line 178 corresponds to the RNL signal 98.

Before a first phase 180 of VTC, the SAP signal 70, the ISOSA signal 78, the SAN signal 104, and DLB 88 are logic highs (e.g., 1) as indicated by the lines 162, 164, 166, and 168 being logic highs and the remaining signals corresponding to lines are logic lows. The first phase 180 may be a pre-charge phase. At the beginning of the first phase 180, a precharge command 181 is received at the command interface 14. During the first phase 180, the ISOSA signal 78 remains on while the SAP signal 70 and the SAN signal 104 are turned off with the NCP signal 124 being off. Sometime after allowing the SAP signal 70 and the SAN signal 104 to turn off, the BLPR signal 72 and the BLCP signal 96 are turned on to pre-charge digit lines (e.g., DLT 82 and DLB 88) and gut nodes (e.g., GUTT 84 and GUTB 83).

A second phase 182 of VTC may occur after pre-charging the digit lines and gut nodes and when an activate (ACT) command 183 is received via the command interface 14. The second phase 182 may be an NSA VTC phase to compensate for VT mismatches between the NSAa 60 and the NSAb 62 in the NSA portion 58. During the second phase 182, the BLCP signal 96 remains on while the ISOSA signal 78 is turned off. Additionally, the NCP signal 124 is turned on. The regulatable nature of the NCP signal 124 enables the memory device 10 to carefully control the RNL signal 98 to operate the NSA region 58 at a near-subthreshold region to match the corner of NMOS. In other words, the NCP signal 124 may be set at some level different than VSS 100 (e.g., 100-300 mV) to bleed charge off more slowly to at least partially reduce power waste during VTC compensation.

When a VT mismatch exists and is reached, the opposite gut node (and connected DL through MCPa 92 or MCPb 94) begins discharging. For example, if the VT of the NSAa 60 is lower than the VT of the NSAb 62, the DLB 88 is discharged via the MCPa 92, the NSAa 60, and the transistor 122. This discharge is indicated by the drop in the line 168 in the graph 160. However, if the VT of the NSAb 62 were to be lower than the VT of the NSAa 60, the DLT 82 would be discharged via the MCPb 94, the NSAb 62, and the transistor 122 instead of discharging the DLB 88. The discharge of one gut node (and corresponding digit line) would then prevent or block continued discharge of the other gut node (and corresponding digit line) due to the connection of each gut node to the other NSA transistor. This cut-off and discharge scheme provides a higher compensation ratio and faster NSA VT compensation than that provided using the sense amplifier 13 of FIG. 2. After the NSA compensation has occurred, the BLCP signal 96 and the NCP signal 124 are turned off and remain off through a third phase 184. During the third phase 184, the memory device turns on a word line in a memory array in the memory bank 12, and the sense amplifier 13 amplifies a small voltage signal by sharing a charge between the memory cell 12 and DLT 82.

During a fourth phase 186, the ISOSA signal 78 is turned on to connect the DLT 82 to the GUTT 84 and the DLB 88 to the GUTB 83 for main sensing. After the ISOSA signal 78 has turned on, the SAN signal 104 is turned on to implement NSA pre-sensing in the NSA region 58 with the VT offset compensated. The NSA pre-sensing phase is to occur because the PSA region 52 was not compensated before sensing. The NSA pre-sensing phase is designed to split the DLT 82 and the DLB 88 to gain a larger amplitude for a signal 187 between the DLT 82 and the DLB 88 before turning on the SAP signal 70 in a fifth phase 188. Once the signal 187 is larger than the VT offset of the PSAa 54 and the PSAb 56, the signal 187 will override the VT offset, and the DLT 82 and the DLB 88 will not flip in the PSA latching in the fifth phase 188. Finally, during the fifth phase 188, the SAP signal 70 is turned on to latch the sense amplifier 13, but the DLT 82 and the DLB 88 will not flip due to enlarged signal 187 leading to a high PSA VT offset tolerance.

Figure 5:
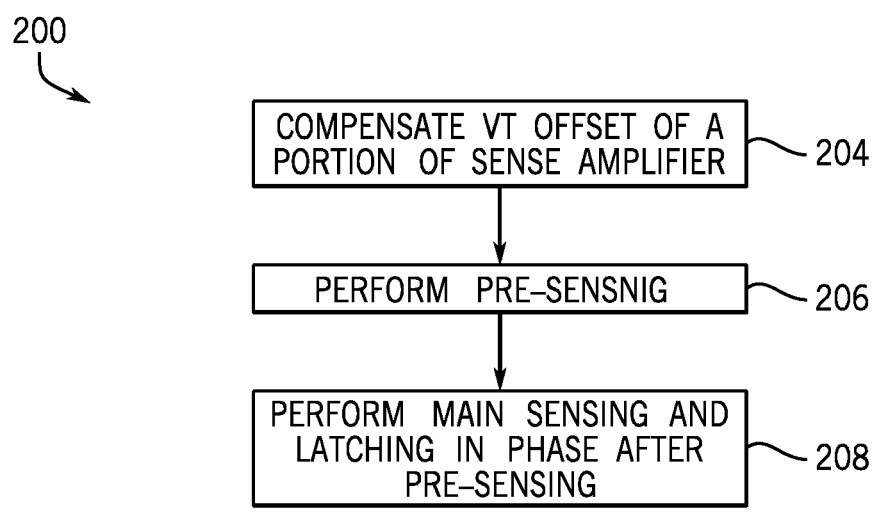
FIG. 5 is a flow diagram of an embodiment of operation using the sense amplifier of FIG. 3, according to an embodiment of the present disclosure.

FIG. 5 is a flow diagram of a process 200. The process 200 includes compensating for a VT offset of a portion of the sense amplifier 13 of FIG. 3 (block 204). The VT offset compensation may be applied to compensate for VT offset of the NSAa 60 and NSAb 62 of the NSA portion 58 only without VT offset of the PSAa 54 and the PSAb 56 like the VTC of the sense amplifier 13 of FIG. 2. However, by singling out the NSA portion 58 for VTC rather than compensating the offset of both the NSA portion 58 and the PSA portion 52 in combination, the VTC of the sense amplifier 13 of FIG. 3 provides a better compensation ratio and/or lower operation current than a VTC of the sense amplifier 13 of FIG. 2.

The process 200 may include the sense amplifier 13 performing charge sharing. The charge sharing using the sense amplifier 13 of FIG. 3 is similar to how the sense amplifier 13 of FIG. 2 performs charge sharing.

As noted in FIG. 4, the sense amplifier 13 performs pre-sensing (block 206) before performing main sensing and latching in a phase after the pre-sensing (block 208). The pre-sensing may be performed on a single type (e.g., N-type) of a memory device without performing sensing of a second type (e.g., P-type) in a subsequent phase. For instance, during the pre-sensing phase, the SAN signal 104 is fired without firing the SAP signal 70 until the main sensing and latching phase after the pre-sensing phase. This bifurcation of the sensing provides an improved corner dependent noise tolerance compared to a one-step sensing where the SAN signal 104 and the SAP signal 70 are fired in the same phase.

Figure 6:
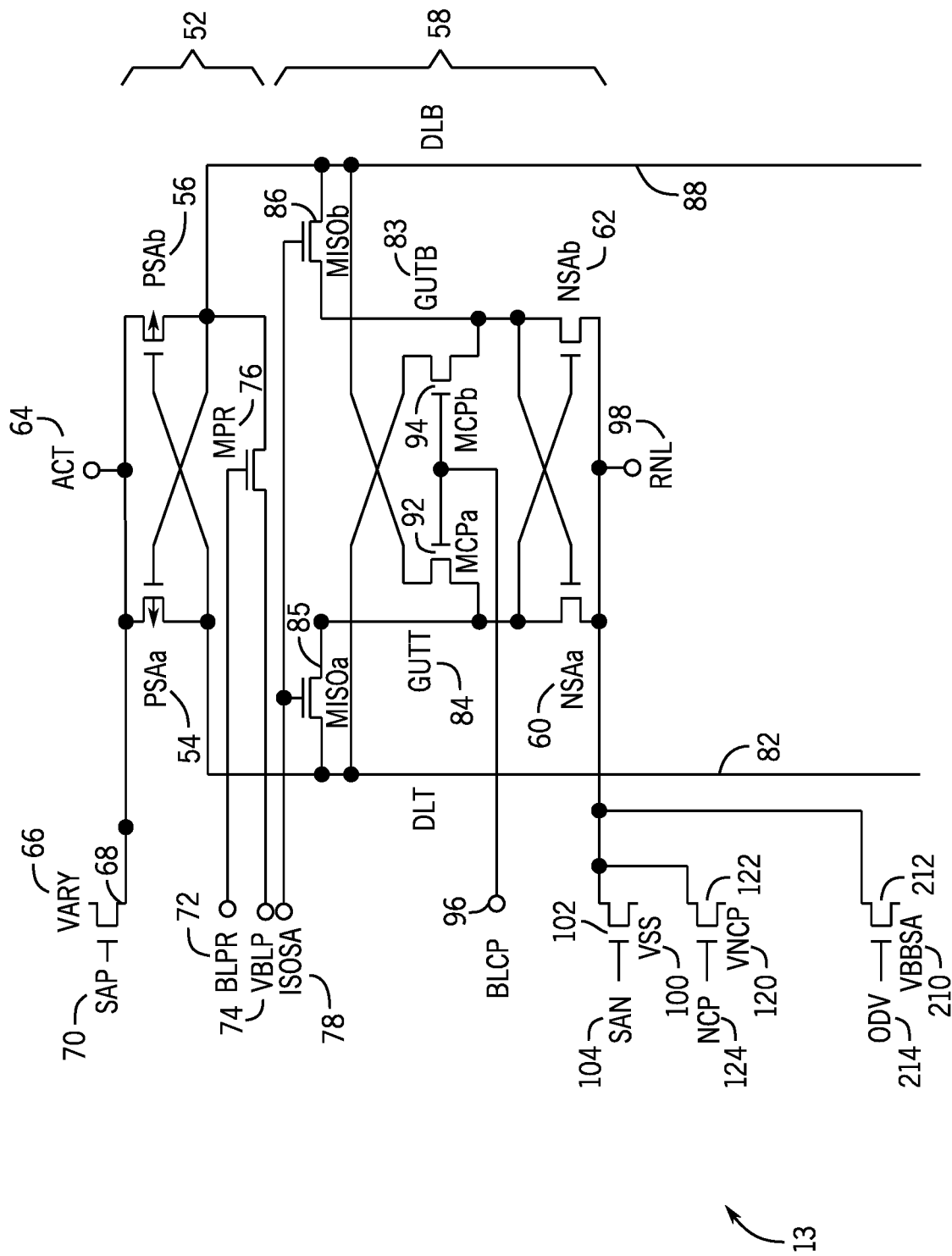
FIG. 6 is an alternative embodiment of the sense amplifier of FIG. 3 with overdriving to accelerate NMOS pre-sensing, according to an embodiment of the present disclosure.

FIG. 6 is a circuit diagram of an alternative embodiment of the sense amplifier of FIG. 3. Specifically, the illustrated embodiment of the sense amplifier 13 in FIG. 6 functions similar to the embodiment of the sense amplifier 13 of FIG. 3 except that the embodiment in FIG. 3 may selectively drive the RNL signal 98 to a voltage VBBSA 210 lower than VSS 100 to overdrive the RNL signal 98 during the fourth phase 186 (e.g., pre-sensing phase). Specifically, the VBBSA 210 is lower (e.g., −200 mV rather than the 0V of VSS) and may be selectively applied using a transistor 212 driven using an ODV signal 214. By overdriving the RNL signal 98 during the pre-sensing phase, pre-sensing may be used to speed the pre-sensing phase. For example, in some embodiments, the speed may be made in exchange for a relatively small amount of overdrive power dissipation to increase tRCD to a point equal to or even faster than VTC using the sense amplifier 13 of FIG. 2.

Figure 7:
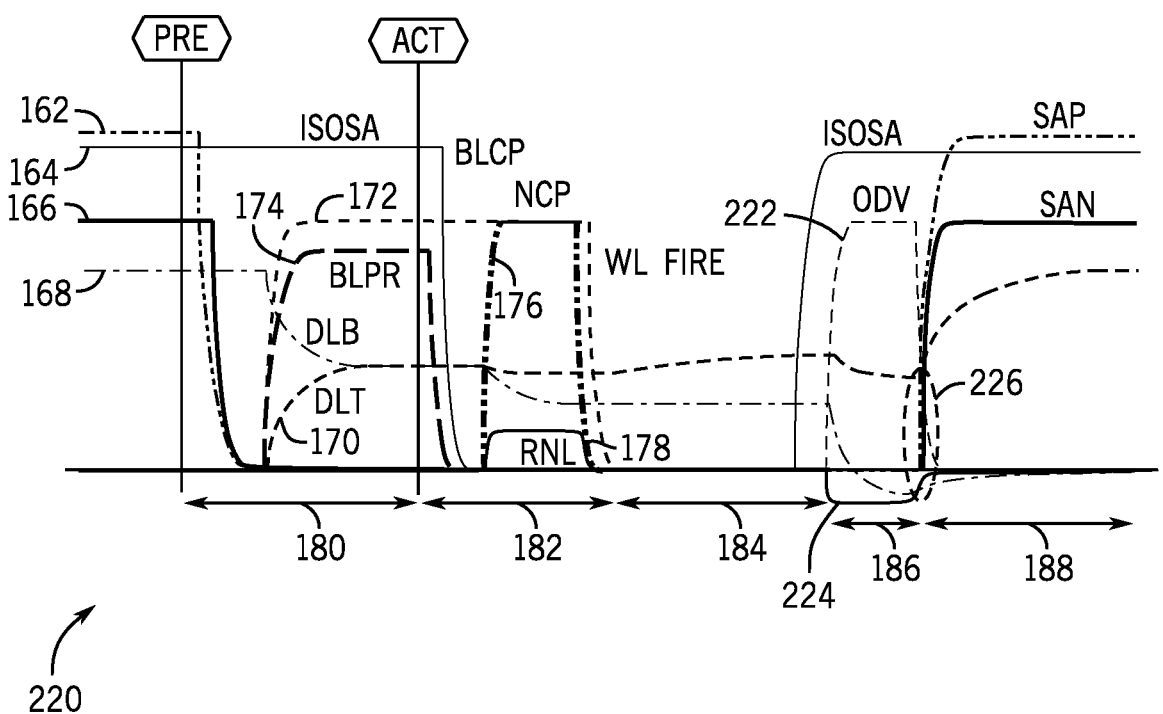
FIG. 7 is a graph of a timing diagram for using the sense amplifier of FIG. 6, according to an embodiment of the present disclosure.

FIG. 7 is a graph 220 of a timing diagram for operating the sense amplifier of FIG. 6. The graph 220 is like the graph 160 of FIG. 4 except that the ODV signal 214 is asserted during the fourth phase 186 (e.g., the pre-sensing phase) to reduce the RNL signal 98 to a lower level 224 (e.g., −200 mV) during the fourth phase 186 to reduce a duration of the pre-sensing duration with the SAN signal 104 firing at time 226.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method of operating a memory device, comprising:
compensating a threshold voltage offset of a portion of a sense amplifier of the memory device, wherein the portion comprises a first pair of transistors each coupled to a respective digit line and a respective gut node of the sense amplifier and further comprises a second pair of transistors each cross-coupled to multiple gut nodes of the sense amplifier, wherein the first pair of transistors comprises N-type transistors, and the second pair of transistors comprises N-type transistors;
performing pre-sensing of the portion of the sense amplifier; and
performing main sensing and latching in a phase after pre-sensing the portion of the sense amplifier.

2. The method of claim 1, wherein the portion of the sense amplifier comprises an N-type sense amplifier portion of the sense amplifier.

3. The method of claim 2, wherein the first pair of transistors are coupled with:
a first transistor of the first pair of transistors comprising a first terminal coupled to a first digit line and comprising a second terminal coupled to a first gut node of the gut nodes; and
a second transistor of the first pair of transistors comprising a third terminal coupled to a second digit line and comprising a fourth terminal coupled to a second gut node of the gut nodes.

4. The method of claim 3, wherein the second pair of transistors are cross-coupled with:
a third transistor of the second pair of transistors comprising a fifth terminal coupled to the first gut node and comprising a first gate terminal coupled to the second gut node; and
a fourth transistor of the second pair of transistors comprising a sixth terminal coupled to the second gut node and comprising a second gate terminal coupled to the first gut node.

5. The method of claim 2, wherein compensating the threshold voltage offset of the portion of the sense amplifier comprises not performing threshold voltage compensation of a remaining portion of the sense amplifier when compensating the threshold voltage offset of the portion of the sense amplifier.

6. The method of claim 5, wherein the remaining portion comprises a P-type sense amplifier portion of the sense amplifier.

7. The method of claim 6, wherein the P-type sense amplifier portion of the sense amplifier comprises a plurality of P-type transistors that are cross-coupled with each other.

8. The method of claim 7, wherein the threshold voltage offset does not compensate for a threshold voltage offset of the plurality of P-type transistors.

9. A sense amplifier, comprising:
a first transistor coupled between a first node configured to receive an activation signal, a first digit line, and a second digit line, wherein the first digit line is configured to receive a first charge from one or more memory cells corresponding to the sense amplifier for sensing, the second digit line is configured to receive a second charge from the one or more memory cells and is complementary to the first digit line;
a second transistor coupled between the first node, the first digit line, and a second digit line;
a third transistor coupled between a first gut node corresponding to the first digit line, a second gut node corresponding to the second digit line, and a second node configured to receive a strobe signal;
a fourth transistor coupled between the first gut node, the second gut node, and the second node; and
threshold voltage compensation circuitry configured to:
compensate for a threshold voltage offset between the third and fourth transistors during a voltage threshold compensation phase without using any threshold voltage offset between the first and second transistors;
pre-sense using the third and fourth transistors during a pre-sense phase; and
sense and latch using the first, second, third, and fourth transistors during a main sensing and latching phase after the pre-sense phase.

10. The sense amplifier of claim 9, wherein the threshold voltage compensation circuitry is configured to perform the pre-sensing using the third and fourth transistors without using the first and second transistors for the pre-sensing.

11. The sense amplifier of claim 9, wherein the first and second transistors comprise P-type transistors, and the third and fourth transistors comprise N-type transistors.

12. The sense amplifier of claim 9, wherein:
the first transistor comprises:
a first terminal of the first transistor coupled to the first node;
a second terminal of the first transistor coupled to the first digit line; and
a third terminal of the first transistor coupled to the second digit line; and
the second transistor comprises:
a first terminal of the second transistor coupled to the first node;
a second terminal of the second transistor coupled to the second digit line; and
a third terminal of the second transistor coupled to the first digit line.

13. The sense amplifier of claim 12, wherein the second terminal of the first transistor comprises a gate terminal, and the second terminal of the second transistor comprises a gate terminal.

14. The sense amplifier of claim 9, wherein:
the third transistor comprises:
a first terminal of the third transistor coupled to the second node;
a second terminal of the third transistor coupled to the first gut node; and
a third terminal of the third transistor coupled to the second gut node; and
the fourth transistor comprises:
a first terminal of the fourth transistor coupled to the second node;
a second terminal of the fourth transistor coupled to the second gut node; and
a third terminal of the fourth transistor coupled to the first gut node.

15. The sense amplifier of claim 14, wherein the second terminal of the third transistor comprises a gate terminal, and the second terminal of the fourth transistor comprises a gate terminal.

16. A memory device, comprising:
one or more memory cells configured to store data;
a pair of digit lines coupled to the one or more memory cells; and
a sense amplifier coupled to the pair of digit lines and comprising:
a pair of cross-coupled transistors each coupled to a first node configured to receive a strobe signal and each of the pair of cross-coupled transistors coupled to a first gut node at a first terminal and a second gut node at a second terminal;
the first gut node corresponding to a first digit line of the pair of digit lines;
the second gut node corresponding to a second digit line of the pair of digit lines;
a third transistor coupled to the first gut node and the second digit line;
a fourth transistor coupled to the second gut node and the first digit line; and
threshold voltage compensation circuitry configured to compensate for a threshold voltage offset between the third and fourth transistors during a voltage threshold compensation phase without using any threshold voltage offset between the pair of cross-coupled transistors.

17. The memory device of claim 16, wherein the threshold voltage compensation circuitry is configured to:
pre-sense using the third and fourth transistors during a pre-sense phase; and
sense and latch using the pair of cross-coupled transistors, the third transistor, and the fourth transistor during a main sensing and latching phase after the pre-sense phase.

18. The memory device of claim 17, wherein the threshold voltage compensation circuitry comprises:
a plurality of isolation transistors configured to selectively couple the first gut node to the first digit line and to selectively couple the second gut node to the second digit line;
a first driver transistor configured to supply a first voltage to the pair of cross-coupled transistors; and
one or more transistors configured to supply a second voltage to the third and fourth transistors.

19. The memory device of claim 18, wherein:
during the voltage threshold compensation phase, the plurality of isolation transistors is configured to disconnect the first gut node from the first digit line and to disconnect the second gut node from the second digit line, and the one or more transistors are configured to supply the second voltage to the third and fourth transistors; and during the pre-sense phase, the one or more transistors are configured to supply a third voltage, wherein the third voltage is lower than the second voltage.

20. The memory device of claim 16, wherein the pair of cross-coupled transistors comprise P-type transistors, and the third and fourth transistors comprise N-type transistors.

* * * * *